Figure 1:
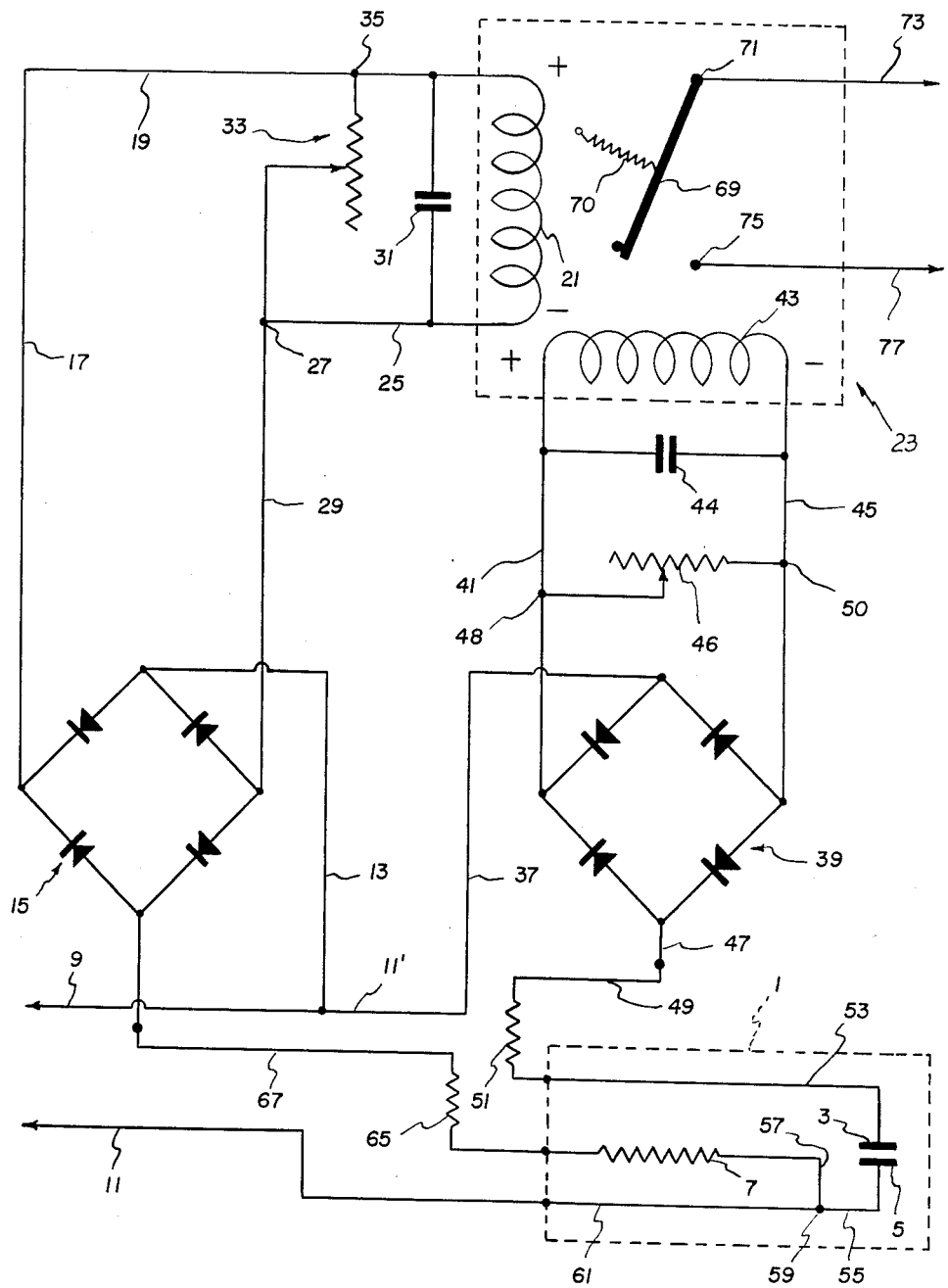

Oct. 18, 1955        W. E. ESTELLE        2,721,297
CONDUCTIVITY MEASURING SYSTEM
Filed Feb. 9, 1954        2 Sheets-Sheet 1

INVENTOR
WEEMS E. ESTELLE.

BY Peck & Peck
ATTORNEYS

Oct. 18, 1955

W. E. ESTELLE 2,721,297

CONDUCTIVITY MEASURING SYSTEM

Filed Feb. 9, 1954

2 Sheets-Sheet 2

INVENTOR
WEEMS E. ESTELLE

BY
Peck & Peck
ATTORNEYS

United States Patent Office 2,721,297
Patented Oct. 18, 1955

2,721,297

CONDUCTIVITY MEASURING SYSTEM

Weems E. Estelle, Annapolis, Md., assignor, by mesne assignments, to McNab, Incorporated, New York, N. Y., a corporation of New York Application February 9, 1954, Serial No. 409,170

4 Claims. (Cl. 317—150)

This invention relates broadly to systems for measuring the concentration of conductive materials in liquids, and in its more specific aspects it relates to an electrical system for causing the operation of an alarm, dump valve or the like circuit when the conductivity of the liquid under test reaches a predetermined value and I have included in the system means providing automatic temperature compensation; and the nature and objects of the invention will be readily recognized and understood by those skilled in the arts to which it relates in the light of the following explanation and detailed description of the accompanying drawings illustrating what I at present believe to be the preferred embodiments or mechanical expressions of my invention from among various other forms, arrangements, combinations and constructions, of which the invention is capable within the spirit and scope thereof.

In marine boiler tube systems and in other applications it is necessary that the saline or other conductivity content of the liquid be maintained below a maximum concentration and in order to indicate and detect an increase in salinity above such maximum level various detection systems have been devised. It is conventional practice to insert one or a plurality of conductivity cells comprising a pair of electrodes into a liquid flow conduit or a tank in which the liquid to be tested is either flowing or stored. These systems involve various means for determining the resistance of the liquid to an electric current when an electric potential is impressed on the electrodes, the resistance of the liquid decreasing with an increase in the concentration of the conductive material therein. Since the resistance between the electrodes varies in accordance with the temperature of the liquid being tested, it has been customary to combine with the conductivity cell a temperature compensator. In salinity indicators of the general purpose for which my system has been devised and where the alarm circuits are temperature compensated, a usual method of compensation includes a specially wound transformer and a gas tube for current amplification and isolation. In the electrical system which I have devised and am about to describe, no transformer is used and the current amplification is obtained by a sensitive polar or differential relay.

The circuit or electrical system which I have devised may be employed in any conductivity measuring system which requires temperature compensation for a controlled circuit, the circuit being used to detect a change in salinity of the liquid under test independent of the temperature of the liquid being tested.

I have accomplished this highly desirable result by employing a temperature compensating resistance circuit which is in parallel with the conductivity cell circuit which includes the electrodes of the cell which are immersed in the liquid under test. My network utilizes a polarized differential relay, one coil of which is energized by the current in the compensating circuit while the other coil of the relay is energized by the conductivity cell circuit. I provide means for rectification in both the cell circuit and the compensating circuit and these may be germanium diode bridges or any other suitable rectification unit.

The conductivity measuring system which I have devised includes a conductivity cell involving electrodes which are adapted to be immersed in the liquid under test and also includes a temperature compensating resistor which is so positioned in the unit that it is subjected to the temperatures of the liquid under test. A temperature compensating element or resistor is selected having a temperature coefficient of resistance approximately the same as the liquid which causes it to feed a similar current as that which flows from the electrode at any given temperature of the liquid. Thus, at any saline concentration of the liquid the cell resistance and the compensator resistance will both decrease with an increase in temperature and this produces an increase of current in both coils of the polarized differential relay which is used as the means for operating a controlled circuit to an alarm, dump valve or the like. As stated above, this increase in cell current which results from an increase in the temperatures of the liquid under test is accompanied by a substantially equal increase in the temperature compensating circuit so that the current into the coils of the relay is not of sufficient differential to actuate the sensitive relay.

It will, therefore, be appreciated that an increase or variation in temperature of the liquid under test will not close the alarm, dump valve or the like circuit since the currents of differing magnitude in the cell circuit caused by variations in temperature of the liquid under test are balanced by the temperature compensator circuit and the alarm will not be operated.

However, at any fixed temperature of the liquid, as the salinity of the liquid increases, the cell current increases due to a decrease in the resistance of the liquid, but under these conditions there is no change in the temperature compensating current. Hence, the cell and compensator circuits will be out of balance and differential currents will be impressed on the coils of the polarized differential relay and these will become great enough to actuate the relay thereby operating the alarm or dump valve circuit.

The circuit involved in this application, therefore, provides automatic temperature compensation for an alarm or dump valve circuit without any manual operation and to a high degree of accuracy.

I have provided an electric circuit for a conductivity measuring system that requires temperature compensation for a controlled circuit at low cost since the rectification means I employ and the necessary sensitive relays embodied in my circuit are relatively inexpensive. All of the various elements of my conductivity measuring system have a long life and are highly shock resistant and the circuit is one which requires little or no supervision so that excellent results are provided at modest cost.

In many installations of conductivity measuring systems it is desirable to control two separate circuits from one source of information. Thus, it may be, and often is, an advantage if a single conductivity cell including a temperature compensating element is connected into an electrical system so that one circuit, such as the controlled alarm circuit may be caused to operate under a certain concentration of the conductive material in the liquid while a separate second circuit, such as a dump valve circuit will be caused to operate at a different concentration of conductive material within the liquid being tested, or with a delayed action relative to the operation of the first circuit.

I have devised a form of electrical system wherein a single conductivity cell and temperature compensating element controls two circuits as above outlined and in an installation of the character of this invention the conductivity cell assembly would be inserted at a point in the liquid flow system where it was desired to monitor the saline or other conductive material to actuate the alarm circuit and the dump valve circuit. In many instances in a system of this character it is desirable to have the alarm actuated at a lower salinity or conductive material concentration than the dump valve. This novel and unique electrical system wherein one cell controls two circuits may be set by means of potentiometers to operate at any salinity value and involves a pair of polarized differential relays and includes in the circuit means whereby the first, or the alarm circuit and its components may be adjusted without affecting the second, or dump valve circuit and its components and the dump valve circuit may always be caused to be actuated following the actuation of the alarm circuit.

In some instances it is desirable to have the alarm and dump valve circuits operate at substantially the same concentration of conductive material in the liquid under test and in this case it is also desirable for the reason stated above to provide means whereby the dump valve circuit will not be actuated until after the alarm circuit has been actuated or closed.

My system will operate in this manner, and the circuits have been so arranged that the connection of the second or dump valve relay into the circuit for flow of current therethrough, following actuation of the first or alarm relay will have no adverse reaction on the first relay and the first relay will continue to function to activate the alarm.

One of the many advantages of the electrical systems which I have devised and are disclosed in this application, is that the circuits involved operate substantially independently of line voltage, so that where wide variations in line voltage occur the circuits will still operate properly.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings, Fig. 1 is a schematic diagram of the electrical circuit employed in my conductivity measuring system.

Figure 2:
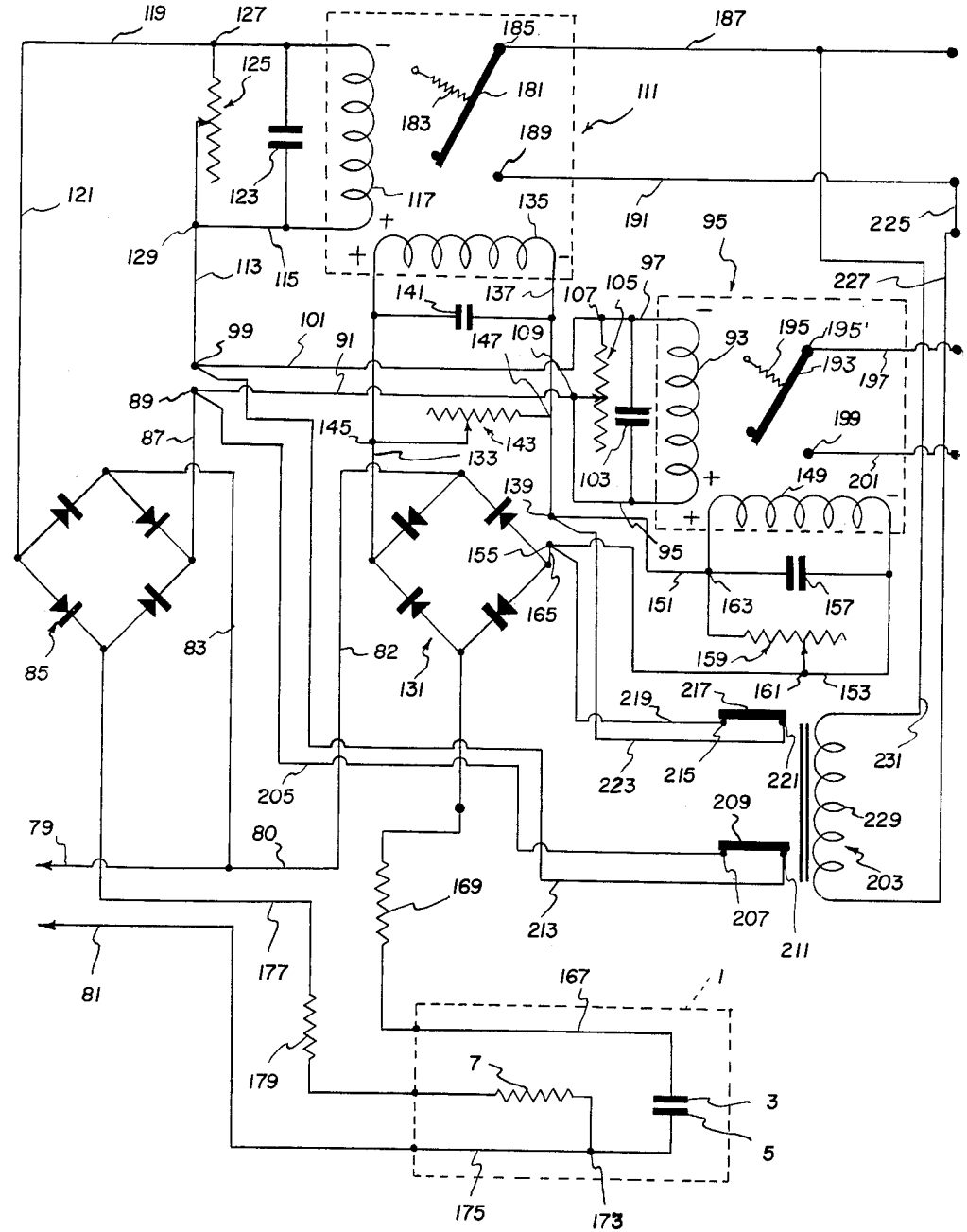

Fig. 2 is a schematic diagram of a further form of electrical system whereby two circuit are controlled by a single conductivity cell including a temperature compensator.

In the accompanying drawings I have illustrated in dotted lines the general outline of a complete conductivity cell and have used the numeral 1 to designate this unit. Mounted in any suitable manner within this conductivity cell are a pair of spaced electrodes 3 and 5 and a temperature compensating resistor 7. Any suitable structural arrangement for the conductivity cell 1 and the elements which are mounted therein may be used, and this conductivity cell may be provided with a plurality of openings therein so that the liquid under test may flow therethrough and in full contact with the electrodes 3 and 5 and in heat conducting relation with the temperature compensating resistor 7.

The conductivity measuring system which I have devised involves an electrical system which includes what I shall term the cell circuit and the temperature compensating resistor circuit and, as will be explained in detail hereinafter, these circuits are connected in parallel.

The leads 9 and 11 may be connected to a source of electric power which may be 115 volts A. C., 60 cycle, the input lead 9 being connected by conductor 13 with a germanium diode bridge rectifier unit designated generally by the numeral 15. This rectifier 15 feeds D. C. current by means of the conductors 17 and 19 into the input side of a coil 21 of a polarized differential relay designated in its entirety by the numeral 23. A conductor 25 leads from the other side of the coil 21 to a junction point 27 where it is connected with a conductor 29 which returns to the germanium diode bridge rectifier 15. A condenser 31 is connected across the leads 19 and 25 of the coil 21 of the polarized differential relay 23 and an adjustable resistance or potentiometer 33 is connected into the temperature compensating resistor circuit at the junction points 27 and 35.

A conductor 67 leads from the bridge rectifier unit 15 through a resistor 65 and is connected to the temperature compensating resistor 7 which is connected to junction 59 through conductor 57 and thus through conductor 61 and conductor 11 to complete the circuit.

The circuit, including the coil 21, which has just been described constitutes the temperature compensating circuit which is connected in parallel with the cell circuit and includes lead 11', to which is connected the conductor 37 which leads into another germanium diode bridge rectifier unit indicated generally by the numeral 39 which I employ in the cell circuit of my electrical system. A lead 41 is connected to the output side of the bridge 39 so that D. C. current will flow to one side of the coil 43 of the polarized differential relay 23. A conductor 45 leads from the other side of the coil 43 and leads to the bridge rectifier 39. A condenser 44 is connected across leads 41 and 45 of the coil 43 of the polarized differential relay 23 and an adjustable resistance or potentiometer 46 is connected into the cell circuit at the junction points 48 and 50. The adjustable resistances 33 and 46 are adjusted to actuate the relay at a predetermined value. By means of conductors 47 and 49 and resistor 51 which is connected between conductors 49 and 53 the electrode 3 is connected into the cell circuit. The electrode 5 is in electrical communication with the electrode 3 through the liquid under test and the electrode 5 is connected into the circuits by means of a conductor 55 which is connected with the terminal 59 which as explained is connected to line 11.

The polarized differential relay 23 is designed to either open or close a controlled alarm or dump valve circuit dependent upon the magnitude of the current flowing through coils 21 and 43 of the relay, and the circuit operates as substantially independent of voltage, i. e., for wide variations in line voltage the circuit will still operate correctly. The relay is provided with a polarized armature 69 which is connected as at 71 with one lead 73 of the controlled circuit which includes an alarm, dump valve or the like. The armature may be spring biased into normal open position by a spring 70 when the current through the coils is substantially balanced, this normal position being illustrated in the drawings, and is the position of the armature when the saline concentration of the liquid is below the predetermined maximum. However, when the salinity concentration in the liquid under test increases and reaches a predetermined maximum so that the resistance between the electrodes 3 and 5 decreases to thereby increase the current flowing into the coil 43, while the current in the temperature compensating circuit and coil 21 remains more or less constant, the armature 69 will be moved to position in electrical contact with terminal 75 of the lead 77 of the controlled circuit to thereby close that circuit and actuate an alarm of any suitable character to indicate that the liquid contains a dangerous amount of conductivity material therein, or as pointed out above the closing of the armature to close the controlled circuit may also cause the actuation of a dump valve as well as an alarm.

It will be appreciated that I have provided a relatively simple, inexpensive electrical system for measuring the conductivity of liquids and for compensating for temperature variations wherein practically no supervision is required and the alarm and dump valve circuit will be automatically operated.

In Fig. 2 of the drawings I have diagrammatically illustrated another form of my invention which embodies the basic concept of the electrical system illustrated in Fig. 1 of the drawings, however the electrical system illustrated in Fig. 2 of the drawings provides circuits whereby two circuits may be automatically and independently controlled from a single conductivity cell which includes a temperature compensating element.

In Fig. 2 of the drawings I have illustrated a conductivity cell unit which may be of the same form as that illustrated in Fig. 1 of the drawings, and I have used the same reference numerals as those used in the description of Fig. 1 of the drawings to illustrate similar parts. This conductivity cell is shown in dotted lines and is designated by the numeral 1 and I may mount in any suitable manner within the cell a pair of spaced electrodes 3 and 5 and a temperature compensating resistor 7. Any suitable structural arrangement for the conductivity cell 1 and the elements which are mounted therein may be used, and this conductivity cell may be provided with a plurality of openings therein so that the liquid under test may flow therethrough and in full contact with the electrodes 3 and 5 and in heat conducting relation with the temperature compensating resistor 7.

As in the electrical system of Fig. 1 of the drawings, the system of Fig. 2 includes two circuits, one of such circuits constituting the cell circuit and the outer constituting the temperature compensating resistor circuit.

The leads 79 and 81 are connected to a source of electric power which may be 115 volts A. C., 60 cycle, the input lead 79 being connected by conductor 83 with a germanium diode bridge or the like rectifier unit designated generally by the numeral 85. The rectifier 85 feeds D. C. current by means of the conductor 87 to a terminal 89. A lead 91 is connected to the terminal 89 and to the input side of a coil 93 of a polarized differential relay designated generally by the numeral 95, the lead 91 being connected to the coil 93 by means of a conductor 95. A conductor 97 leads from the other side of the coil 93 and is in electrical contact with a further terminal 99 by means of a conductor 101. A condenser 103 is connected across the leads 95 and 97 of the coil 93 of the polarized differential relay 95 and an adjustable resistance or potentiometer 105 is connected into the circuit of the coil at the points 107 and 109.

I provide a further polarized differential relay designated in its entirety by the numeral 111, and as will become apparent as the description proceeds, this relay 111 is similar to the relay 95. By means of a conductor 113 which is connected to the terminal 99 and a further conductor 115 connected with the conductor 113 one side of the coil 117 of the polarized differential relay 111 is connected into the circuit and a conductor 119 is connected to the other side of the coil 117 and this conductor 119 through conductor 121 is connected into the rectifier 85. A conductor 177 leads from rectifier 85 through resistor 179 and through resistor 7 to junction 173 and conductors 175 and 81 to complete the circuit. A condenser 123 is connected across the leads 115 and 119 of the coil 117 and an adjustable resistance or potentiometer 125 is connected into the circuit at the junction points 127 and 129.

The lead 79 is connected to a conductor 80 which in turn is connected to a conductor 82 which connects into a germanium diode bridge or the like rectifier unit designated generally by the numeral 131 and a conductor 133 is connected into one terminal of this bridge circuit to feed D. C. current to the input side of the other coil 135 of the polarized differential relay 111, a conductor 137 leading from the other side of said coil 135 and connected into a terminal or junction point 139. A condenser 141 is connected across the leads 133 and 137 and an adjustable resistance or potentiometer 143 is connected into the circuit of coil 135 at the junction points 145 and 147.

The other coil 149 of the polarized differential relay 95 is connected at its positive side into the heretofore described circuit by means of a conductor 151 which is connected to the terminal 139, and a conductor 153 leads from the other side of the coil 149 and is connected to a terminal 155. A condenser 157 is connected across the leads 151 and 153 of the coil 149 and an adjustable resistor or potentiometer 159 is connected into the coil circuit at junction points 161 and 163. The conductor 153 is connected into the rectifier 131 by means of a conductor 165 which is connected at one end to the terminal point 155 and at its other end into the rectifier circuit. The rectifier unit 131 is connected to the electrode 3 by means of a conductor 167 which includes a resistance 169. A conductor 171 is connected to the electrode 5 and to conductor 175 at junction point 173 to complete the circuit through lead 81.

The polarized differential relay 111 is designed to either open or close a controlled circuit which in this example may be an alarm circuit, and, as in the form of my invention illustrated in Fig. 1 of the drawings, the activation of the polarized relay 111 to thereby close the alarm circuit controlled thereby is dependent upon a differential in the magnitude of the current flowing through the coils 117 and 135 of the relay. This relay is provided with a polarized armature 181 which may be biased in normal open position by means of a spring 183, the polarized armature being connected as at 185 with one lead 187 of a controlled circuit which may include a visual or audible alarm. The polarized armature 181 is in normal open position as illustrated in the drawing when the current flowing through the coils 117 and 135 is substantially balanced and this occurs when the saline concentration of the liquid being tested is below a predetermined maximum. However when the salinity concentration in the liquid increases and reaches a predetermined maximum as determined by the setting of the variable resistance 143 so that the resistance between the electrodes 3 and 5 decreases to thereby increase the current flowing through the coil 135, while the current in the temperature compensating circuit and coil 117 remains more or less constant, the polarized armature 181 will be actuated to position in electrical contact with terminal 189, to which is connected the lead 191 of the controlled circuit to thereby close that circuit and actuate the alarm.

The polarized differential relay 95 includes a polarized armature 193 which is normally maintained in open or inoperative position by means of a suitable biasing spring 195 as disclosed in the drawings. This polarized armature 193 is connected as at 195' with one lead 197 of a controlled or high salinity circuit which may include a dump valve. When a differential exists in the magnitude of the current flowing through coils 93 and 149, as will be explained hereinafter, the polarized armature 193 is actuated to closed position in electrical contact with the contact 199 of the other lead 201 of the second or high salinity dump valve circuit.

In many applications of conductivity measuring systems it is desirable to have separate alarm and dump valve circuits so that the alarm may be actuated at a lower salinity concentration than the concentration required for actuation of the dump valve. In a system involving two generally similar polarized differential relays one adapted to control the operation of the first or alarm circuit and the other adapted to control the operation of the second, dump valve or high salinity circuit and where each of such relays may be set to be actuated at a predetermined salinity value, it is desirable to provide means ensuring the operation of the alarm circuit prior to the operation of the dump valve circuit and it is also desirable to provide means whereby the relay of one of the circuits such as the alarm circuit may be adjusted without affecting the relay of the second or the dump valve circuit. I have also provided a system wherein there will be no adverse reaction of the function of the relay controlling the first circuit when the relay controlling the second circuit is energized by being connected into the system. The system illustrated in Fig. 2 of the drawings provides means for accomplishing the above results and for automatically cutting the polarized differential relay 95 from the circuit when relay 111 is open so that relay 95 is only energized following closing of relay 111 and then closes its circuit when there is a differential between the magnitude of the current flowing through coils 93 and 149 as occurs when the salinity concentration of the liquid reaches the value for which the relay is set by means of adjustable resistance 159.

The circuit which I utilize for cutting the polarized differential relay 95 into and out of the hereinbefore described electrical circuits under certain sets of conditions includes an activating relay indicated generally by the numeral 203, and this relay may be a double pole single throw solenoid actuated relay. This relay is connected into the electrical system by means of a conductor 205 which extends from the terminal 89 to a terminal 207 which is in electrical contact with a usual movable contact arm 209 of the activating relay. A contact 211 is provided which is normally engaged by and is in electrical contact with the contact arm 209, and a conductor 213 connects the terminal or contact 211 with the terminal 99 which in turn is in electrical contact with the output line 101 from the coil 93 of the relay, it being understood that the other terminal 89 connects with the conductor 91 which feeds the coil 93 of the relay 111.

The activating relay 203 is connected into the electrical circuit of the coil 149 of relay 95 by means of a contact 215 which is electrically connected with a usual contact arm 217 of the activating relay, and the contact 215 is connected by a conductor 219 with the contact point or terminal 155 which in turn is connected into the output side of the coil 149 by the conductor 153. A further contact 221 is normally engaged by the contact arm or bridging element 217 and the contact 221 is connected by means of a conductor 223 with the terminal 139 which in turn is connected with the feed conductor 151 of the coil 149 of polarized differential relay 95. The first controlled or alarm circuit which in turn is controlled by the polarized differential relay 111 is served by an input line 225 which may supply current of a value of 115 volts A. C., 60 cycles, the other input 227 of this controlled circuit being connected to one side of the winding 229 of the activating relay 203, the other side of the winding 229 being connected to the other conductor 187 of the first controlled circuit by a conductor 231.

When the conductivity cell including the temperature compensating resistor is immersed in a liquid to be tested, the potentiometers of the polarized differential relays 95 and 111 having been set for operation at a certain salinity value, the magnitude of the current flowing through coils 117 and 135 of relay 111 will be substantially the same as long as the salinity concentration does not reach the value for which the relay is set so that the polarized armature 181 of this relay will remain in open position and the alarm circuit will not be closed. With this condition existing the windings of the activating relay 203 will not be energized and the contact arms 209 and 217 will be closed to connect the lines 205, 213 and 219, 223 respectively, and by this arrangement with the relay 111 open and relay 203 deenergized shorts are placed across both coils of relay 95 and, therefore, the coils of relay 95 will be deenergized and the armature 193 will be in open position as illustrated in the drawings and the second, high salinity or dump valve controlled circuit will not be closed. It will be apparent that with the apparatus in this condition, that is with the armature 181 of relay 111 in open position so that the coils 93 and 149 of relay 95 are deenergized the sensitivity of adjustment of relay 111 may be made completely independent of the setting of the potentiometer of relay 95.

When the salinity concentration of the liquid reaches a concentration of a value for which relay 111 has been set to operate to close the alarm circuit the polarized armature 181 will be actuated to make electrical contact at 189 to close this first or alarm circuit. When this occurs the activating relay 203 will be energized through current flowing to the winding thereof through lead 187 and conductor 231 and through conductor 227 to complete this circuit. Upon energization of the activating relay 203, the contact arms 209 and 217 will be moved from contacting position with contacts 211 and 221 to thereby open those two circuits and eliminate the shorts in the circuits to coils 93 and 149 of relay 95. With these two circuits which are controlled by the activating relay open current will flow to the coils 93 and 149 and as long as the salinity concentration of the liquid under test does not reach the value for which this relay 95 is set by means of the potentiometer 159 the armature 193 will remain in the illustrated open position and the high salinity or dump valve circuit will not be closed. However, when the concentration of the salinity reaches the value at which the relay 95 is set to operate, a differential will exist between the magnitude of the current flowing through coils 93 and 149 to thereby actuate the armature 193 to close this second or high salinity dump valve circuit by means of the actuation of the armature to position making electrical contact with the contact 199 of the lead 201. When this condition exists so that both polarized differential relays are closed and relay 111 has closed the first circuit to operate the alarm, the alarm will continue to be operated even after relay 95 has operated to close the high salinity alarm or dump valve circuit.

It will be appreciated that I have evolved a simple and highly efficient system for controlling the operation of two circuits from a single source of information.

I claim:

1. An electric conductivity measuring system for causing the sequential operation of first and second controlled circuits when the concentration of conductive material under test reaches predetermined values, including a single conductivity cell comprising electrodes adapted to be immersed in the liquid under test and a temperature compensating element in heat conducting relation with the liquid under test and having a temperature coefficient of resistance approximately the same as the liquid under test, a source of current, and said system comprising a first electric circuit including said electrodes and a second electric circuit including said temperature compensating element, said electric circuits being connected in parallel, and a first polarized differential relay having a pair of coils, one of said coils being connected in said first electric circuit and the other of said coils being connected in the second electric circuit, and a first controlled circuit connected to said first polarized differential relay and closed thereby upon actuation of said relay when there is a differential between the currents impressed on said coils, and a second polarized differential relay connected in series with said first polarized differential relay and having a pair of coils, one of said coils receiving current from said first electric circuit and the other of said coils receiving current from said second electric circuit, and a second controlled circuit connected to said second polarized differential relay and closed thereby upon actuation of said relay when there is a differential between the currents impressed on said coils, and means cutting said second polarized differential relay out of the first and second circuits when the coils of said first polarized differential relay are receiving currents of substantially equal magnitude so that said first controlled circuit is open, and further means connected to said first controlled circuit and said means and actuable to connect said second polarized relay into the first and second circuits when said first controlled circuit is closed by actuation of said first polarized differential relay.

2. An electric conductivity measuring system in accordance with claim 1, wherein said further means is a relay energized by the closing of said first controlled circuit by actuation of said first polarized differential relay.

3. An electric conductivity measuring system in accordance with claim 1, wherein said first-named means includes shorting circuits connected to and across the leads to the coils of said second polarized relay which circuits are closed when the first controlled circuit is open and said further means includes a relay connected to said first controlled circuit and said shorting circuits and said relay being energized when said first controlled circuit is closed to open said shorting circuits for flow of current to the coils of said second polarized relay.

4. An electric conductivity measuring system for causing the sequential operation of first and second controlled circuits when the concentration of conductive material under test reaches predetermined values, including a single conductivity cell comprising electrodes adapted to be immersed in the liquid under test and a temperature compensating element in heat conducting relation with the liquid under test and having a temperature coefficient of resistance approximately the same as the liquid under test, a source of alternating current, and said system comprising a first electric circuit including said electrodes and a second electric circuit including said temperature compensating element, said electric circuits being connected in parallel, and a first polarized differential relay having a pair of coils, one of said coils being connected in said first electric circuit and the other of said coils being connected in the second electric circuit, and a first controlled circuit connected to said first polarized differential relay and closed thereby upon actuation of said relay when there is a differential between the currents impressed on said coils, and a second polarized differential relay connected in series with said first polarized differential relay and having a pair of coils, one of said coils receiving current from said first electric circuit and the other of said coils receiving current from said second electric circuit, and a second controlled circuit connected to said second controlled differential relay and closed thereby upon actuation of said relay when there is a differential between the currents impressed on said coils, and a rectification circuit in each of said first and second circuits, and shorting circuits connected across the leads to each of the coils of said second polarized relay, a relay connected to said shorting circuits and operable to open and close said circuits, and said relay connected to said first controlled circuit and energized when said first controlled circuit is closed to thereby open said shorting circuits for flow of current to said second polarized differential relay.

References Cited in the file of this patent

UNITED STATES PATENTS

| Number | Name | Date |
|---|---|---|
| 1,450,023 | Edelman | Mar. 27, 1923 |
| 1,912,188 | Gann | May 30, 1933 |
| 1,951,035 | Parker | Mar. 13, 1934 |
| 2,117,670 | Ketay et al. | May 17, 1938 |
| 2,611,113 | Cade et al. | Sept. 16, 1952 |